Feb. 6, 1934.                W. N. GLAB                1,945,684
                        CONCENTRATED VALVE CONTROL
                    Filed Jan. 26, 1931      2 Sheets-Sheet 1
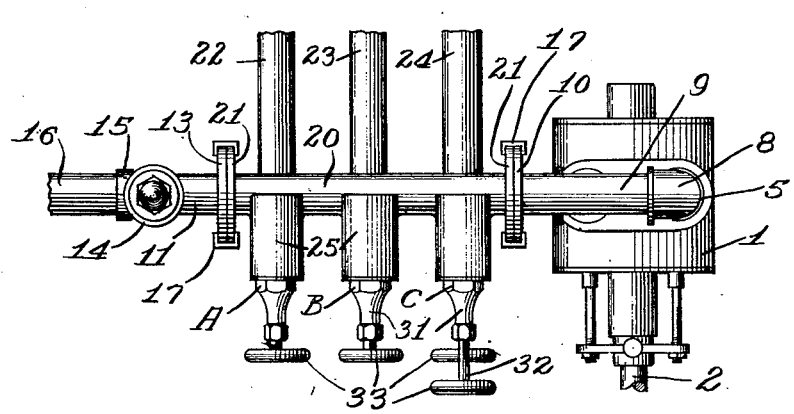
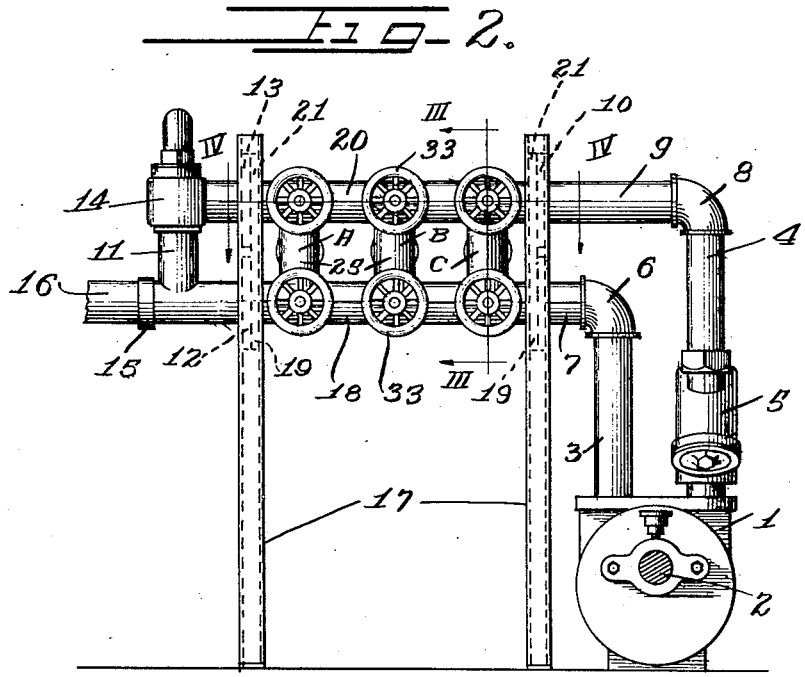
Inventor
William N. Glab.
by Charles M. Willatts

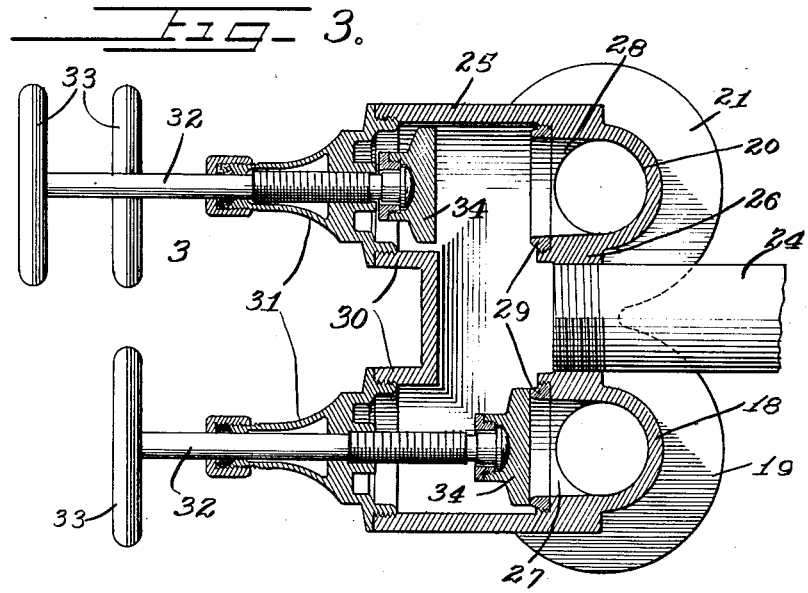
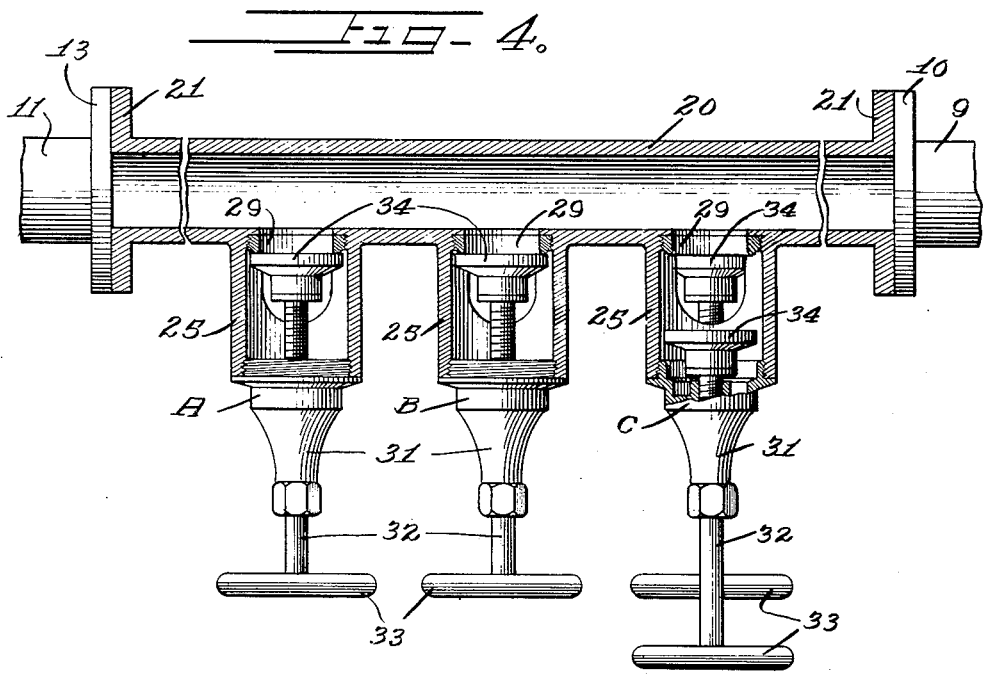

Patented Feb. 6, 1934

1,945,684

UNITED STATES PATENT OFFICE 1,945,684

CONCENTRATED VALVE CONTROL

William N. Glab, Dubuque, Iowa, assignor to Morrison Bros., Dubuque, Iowa, a corporation of Iowa Application January 26, 1931. Serial No. 511,150

1 Claim. (Cl. 137—78)

The present invention pertains particularly to an improved concentrated valve control unit adaptable for use in a liquid receiving and distributing system to provide a central combination control, operable by a single operator, to permit the liquid from a source of supply such as a tank car or the like to be delivered selectively to any one of a plurality of receiving or storage tanks, or to a vehicle truck loading rack, or if desired from one storage tank into another by a selective operation of the respective valves forming part of the control unit which valves are so arranged in parallel connecting the pressure pipe line and the suction pipe line of the unit in such a manner that the flow through the pipe lines is not interfered with by the valves or valve stems.

It is an object of this invention to provide an improved concentrated valve control unit for governing the filling and emptying of a plurality of remotely located tanks and the like, said control unit having the valve mechanisms so positioned that they will not interfere with the flow through the main pipe lines of the system thereby obviating the formation of any eddy currents in the pipe lines.

It is also an object of this invention to provide an improved type of concentrated valve control unit wherein the pressure pipe line and the suction pipe line connected with a pump mechanism are connected by means of a plurality of parallel valve units having the valve mechanisms mounted in the valve casings out of the paths of flow of the pressure and the suction pipe lines obviating the formation of eddy currents therein thereby greatly increasing the efficiency of the concentrated valve control unit.

It is an important object of this invention to provide an improved concentrated valve control unit conveniently operable by a single operator to permit oil or other liquids to be received from a supply tank car and be pumped into one or more storage tanks or into a receiving truck at a loading rack, with said control unit having the valve seats, the valves and the valve stems mounted in valve casings connected in parallel between the pressure pipe line and a suction pipe line thereby keeping said pipe lines free from obstructions, eliminating interference in the main flow lines, thereby obviating the formation of eddy currents and affording an arrangement greatly facilitating the distribution or re-distribution of the oil or liquid being handled in the system.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a concentrated valve control unit embodying the principles of this invention;

Figure 2 is a front elevation of the control unit;

Figure 3 is an enlarged sectional view taken on line III—III of Fig. 2 with parts in elevation and showing one of the valves in open position and the other valve in closed position;

Figure 4 is an enlarged fragmentary longitudinal detailed section taken on line IV—IV of Fig. 2, illustrating the valve mechanisms to one side of a main pipe line leaving the path of flow through the pipe line free from obstruction.

As shown on the drawings:

The reference numeral 1 indicates a pump mechanism provided with a driving shaft 2 adapted to be rotated by a motor or any other suitable source of power. Connected to the discharge opening of the pump 1 is one end of a pressure or discharge pipe 3. Also connected with the pump 1 is a suction or intake pipe 4 having a filter unit 5 mounted therein. Connected to the upper end of the pressure pipe line 3 by means of an elbow 6 is a pipe section 7 having an apertured flange formed on the end thereof. Connected at right angles to the upper end of the suction or intake pipe 4 by means of an elbow 8 is a pipe section 9 provided with an apertured end flange 10.

A U-shaped union 11 forms the second end of the concentrated valve control unit and is provided with flanges 12 and 13 integrally formed on two of the ends thereof. Connected in the union 11 is a release valve 14. The union 11 is provided with an outlet arm 15 to which one end of a truck tank loading pipe 16 is connected. The other end of the pipe 16 leads to a loading rack or platform and is adapted for use in delivering oil or any other liquid being handled into the tanks of vehicle trucks or the like.

Connected between the union 11 and the pipe sections 7 and 9 connected with the pump mechanism is an improved concentrated valve control unit which is supported in place by means of supporting frames 17 or the like.

The improved concentrated valve control unit is of the multiple valve type and comprises a main pressure or feed pipe 18 provided with end flanges 19 and a main distributing or suction pipe 20 provided with end flanges 21.

The two main pipe lines 18 and 20 are disposed in parallel relation with respect to one another and are connected by means of a plurality of valve units A, B and C having respectively connected thereto pipe lines 22, 23 and 24. The pipe line 22 connects the valve unit A with a liquid storage tank or container mounted in a remote position. The pipe line 23 connects the valve unit B with a remotely positioned oil receiving tank or container. The pipe line 24 connects the valve unit C with a remotely located oil supply tank car from which the oil or liquid supply is received.

All of the valve units A, B and C are constructed exactly alike and each comprises a U-shaped passaged housing or casing 25 integrally connected transversely of the main pipes 18 and 20. The valve housing or casing 25 is provided at its middle portion between the pipes 18 and 20 with an internally threaded neck or sleeve 26 for receiving one of the pipe lines 22, 23 or 24, as the case may be. The valve housing 25 is provided with an intake neck 27 communicating with the interior of the main pipe 18 and an outlet or distributing neck 28 communicating with the distributing pipe line 20 as clearly illustrated in Fig. 3. Mounted in the valve housing 25 at the inner end of each of the passages 27 and 28 is a valve seat 29.

The valve housing or casing 25 is provided with a pair of parallel arms 30 the outer end of each of which is closed by means of a threaded cap 31 which is passaged and threaded to receive a threaded valve stem 32 having a valve handle or wheel 33 secured on the outer end thereof. Mounted on the inner end of each of the valve stems 32 is a valve head 34 adapted to coact with the respective valve seat 29 to close or open the passage between the valve chamber of the valve housing 25 and either one of the main pipes 18 or 20.

With the concentrated valve control units connected between the union 11 and the pipes connected with the pump 1 a control system, operable if preferred by a single operator, is provided to form a central station liquid distributing control system whereby the filling and discharging of remotely positioned cars, tanks and the like may be conveniently governed so that a supply of oil or other liquid from a tank car may be conveniently delivered through the pipe line 24 when the upper valve 34 is open as illustrated in Figure 3 permitting the supply of liquid to pass through the passage 28 into the distributing pipe 20 from which the supply of liquid is drawn by the suction action caused by the pump 1. From the pump 1 the liquid is discharged through the pressure pipe 3 into the main feed or distributing pipe 18 from which the liquid is adapted to be distributed to either of the distributing pipes 22 or 23 leading to the storage tanks when the respective lower control valves of the valve units A or B are opened or if preferred the liquid may be permitted to pass undisturbed through the pipe 18 out through the discharge pipe 16 to be conducted to a vehicle truck at the loading rack.

The concentrated valve control unit is so constructed that the pressure and suction pipes connected with the pump have the flow passages thereof free from any obstruction or control mechanism as clearly illustrated in Figure 4 due to the novel arrangement of connecting the pipes 18 and 20 by means of a plurality of valve housings 25 which are arranged on one side of the pipes so that the valves 34, the valve stems 32 thereof and the valve seats 29 are mounted out of the passages of the pipes 18 and 20 so that the creation of eddy currents in the pipe passages is entirely eliminated due to the fact that the valves 34 and the valve stems 32 are mounted to operate in the valve housings 25 and do not project into the path of flow of the pipes 18 and 20.

It will thus be noted that the improved concentrated valve control units afford a convenient arrangement whereby a plurality of control valve units are mounted in parallel and are connected to the sides of a pair of parallel main pipes but are not arranged to cut across the flow passages of said pipes as in earlier constructions. By providing a concentrated valve control unit wherein the main flow pipes are free from obstructions a greater efficiency is obtainable due to the elimination of eddy currents in the main flow passages. A central selective control for a plurality of supply and delivery oil tanks is afforded by the improved concentrated valve control unit of this invention, whereby an operator may conveniently control the delivery of oil from a supply car to any selected one or group of receiving tanks, or, if preferred, directly to a loading rack.

It will of course be understood that many changes may be made and various details of construction may be varied through a wide range without departing from the principles of this invention and it is therefore not purposed to limit the patent granted hereon otherwise than necessitated by the scope of the appended claim.

I claim as my invention:

A multiple valve structure comprising a housing defining a pair of parallel passageways and a lateral valve chamber interconnecting said parallel passageways, valve seats at the junction of said chamber with said passageways, said chamber having a lateral opening on the side towards said passageways and disposed therebetween, said opening being adapted for connection to a pipe, valve members in said chamber operatively associated with said seats for selectively controlling flow between said chamber and passageways, means for actuating said valve members, said means being so disposed as to afford uninterrupted flow through the passageways in either open or closed positions of said valves, and recessed portions in said chamber for receiving said valve members when in fully open position, to enable uninterrupted flow between the chamber and passageways.

WILLIAM N. GLAB.